United States Patent
Hazama et al.

(10) Patent No.: US 6,389,227 B1
(45) Date of Patent: May 14, 2002

(54) LENS-FITTED FILM UNIT

(75) Inventors: Kiyoaki Hazama, Hino; Kazuhisa Aratame, Kobe; Kijiro Suzuki, Kobe; Akihiko Fujiwara, Kobe; Tsutomu Kako, Kobe, all of (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/585,015

(22) Filed: Jun. 1, 2000

(30) Foreign Application Priority Data

Jun. 1, 1999 (JP) .......................................... 11-153895

(51) Int. Cl.$^7$ ................................................ G03B 17/02

(52) U.S. Cl. .......................................... 396/6; 396/538

(58) Field of Search ........................ 396/6, 538, 535, 396/536

(56) References Cited

U.S. PATENT DOCUMENTS 6,011,923 A * 1/2000 Solomon et al. ............... 396/6

* cited by examiner

Primary Examiner—David M. Gray
Assistant Examiner—Rochelle Blackman
(74) Attorney, Agent, or Firm—Bierman, Muserlian and Lucas

(57) ABSTRACT

A lens-fitted film unit and production thereof, wherein lens-fitted film unit has a front cover, a rear cover, a main body and a magazine chamber lid to take out a film magazine from a film magazine chamber located in the main body, below the film magazine chamber and at the bottom surface of the lens-fitted film unit. The front cover, rear cover and main body have respectively a rib, and the surrounding of the lower portion of the film magazine chamber is surrounded by the rib of the front cover, the rib of the rear cover and the rib of the main body. After the rear cover is attached, the film magazine chamber lid is attached so that the magazine chamber lid is fixed to the front and rear cover and is not fixed to the main body.

18 Claims, 3 Drawing Sheets

LENS-FITTED FILM UNIT

BACKGROUND OF THE INVENTION

The present invention relates to a lens-fitted film unit, and further, to a production method of the lens-fitted film unit suitable for the recycling.

Conventionally, a re-usable lens-fitted film unit, which includes: a unit main body having, a photographing image plane frame for forming a photographing image plane by exposing the unexposed film by a picture taking lens, and an unexposed film chamber in which the unexposed film is previously accommodated in the production process, which is provided on one side, and an exposed film chamber in which a film magazine in which the exposed film is accommodated, is accommodated, which is provided on the other side, with the photographing image plane frame between them; and a front cover to cover the unit main body and the rear cover to cover the unit main body, is known.

This lens-fitted film unit has an exposed film chamber in which a film magazine is accommodated, and a film magazine. chamber lid to take out the film magazine is provided on the bottom surface portion of the lens-fitted film unit, and is integrally fabricated with the rear cover, and rotatable to the rear cover. Further, this film magazine chamber lid is fixed to the front cover. For taking out the film magazine, this portion is mechanically structured such that the fixing of the film magazine chamber lid is released, and the film magazine chamber lid is opened, and the film magazine is taken out.

However, when the film magazine chamber lid is integrally fabricated with the rear cover rotatably, because the wall thickness of the rotational portion is thin, there is a problem that it is easily broken. Further, when the film magazine chamber lid is rotatably formed to the rear cover, by the breakage of a hinge, or the like, which is rotatable, an outside ray of light enters the inside of the lens-fitted film unit, and there is also a problem that the light fog easily occurs on the film.

Specifically, when previously used lens-fitted film unit is used and the lens-fitted film unit is newly produced, because the problem of the light leak due to the breakage of the hinge of the film magazine chamber lid is conspicuous, it is very difficult that the rear cover of the used lens-fitted film unit is re-used as it is.

SUMMARY OF THE INVENTION

In view of the foregoing problems, the present invention is attained, and one of the object of the present invention is to provide a lens-fitted film unit in which the lens-fitted film unit can be easily recycled. Further, anther object of the present invention is to provide a lens-fitted film unit by which the unnecessary light from the periphery of the film magazine chamber lid of the lens-fitted film unit into the inside of the unit main body is securely blocked.

The present invention is attained in view of the foregoing problems, and the object of the present invention is to provide a production method of the lens-fitted film unit by which, even when the lens-fitted film unit is newly produced by using the used lens-fitted film unit, the light shielding can be securely conducted, the problem of the light leak does not occur, and in addition to it, the rear cover of the used lens-fitted film unit can also be recycled as it is.

Further, another object of the present invention is also to provide a production method of the lens-fitted film unit by which the exposed film can be taken from the used lens-fitted film unit without damaging the main body, and the main body can be securely recycled.

Structures (1) to (20) to attain the above objects are as follows.

Structure (1): A production method of the lens-fitted film unit, which has the following steps: a step to take off a rear cover of a used lens-fitted film unit from which a film magazine in which the photographic film is accommodated, is removed; a step to load the unexposed photographic film into the main body; and a step to attach the rear cover, wherein the lens-fitted film unit has the main body, and the front cover and the rear cover to cover the main body; the main body has a film magazine chamber in which the film magazine for accommodating the photographic film is accommodated, and an unexposed film chamber in which the unexposed photographic film is previously accommodated; the lens-fitted film unit has a film magazine chamber lid to take out the film magazine from the film magazine chamber, provided below the film magazine chamber and at the bottom surface of the lens-fitted film unit; the front cover and rear cover and the main body have respectively a rib, and the surrounding of the lower portion of the film magazine chamber is surrounded by the rib of the front cover, the rib of the rear cover and the rib of the main body; and after the rear cover is attached,-the film magazine chamber lid is attached so that the side wall portion of the film magazine chamber is located outside the rib of the front cover, the rib of the rear cover and the rib of the main body.

Structure (2): A production method of the lens-fitted film unit according to Structure (1), wherein the film magazine chamber lid is attached so that the film magazine chamber lid is fixed to at least one of the front cover and the rear cover, and is not fixed to the main body.

Structure (3): A production method of the lens-fitted film unit according to Structure (1), wherein the rear cover is attached so that a portion of the rib of the rear cover enters the inside more than the rib of the main body.

Structure (4): A production method of the lens-fitted film unit according to Structure (1), wherein the rib of the main body has a straight portion, curved portion, and bent portion.

Structure (5): A production method of the lens-fitted film unit according to Structure (2), wherein the fixing of the film magazine chamber lid to the front cover or the rear cover is conducted by an engagement claw.

Structure (6): A production method of the lens-fitted film unit according to Structure (1), wherein the production method has a step in which an outer member is provided on the lens-fitted film unit so that at least, portion of the front cover or the rear cover is covered, and the film magazine chamber lid is not covered.

Structure (7): A production method of the lens-fitted film unit according to Structure (6), wherein the outer member is a label, and the label is provided on the lens-fitted film unit so that it is adhered onto at least, one portion of the front cover or the rear cover, and is not adhered onto the film magazine chamber lid.

Structure (8): A lens-fitted film unit, which comprising: a main body; the photographic film previously accommodated in the main body; and the front cover and rear cover to cover the main body, wherein the main body has a film magazine chamber in which the film magazine for accommodating the photographic film is accommodated; the lens-fitted film unit has a film magazine chamber lid to cover an opening portion provided below the film magazine chamber and on the bottom surface of the lens-fitted film unit; and the front cover and rear cover and the main body have respectively a rib; and the surrounding of the lower portion of the film magazine chamber is surrounded by the rib of the front cover, the rib of the rear cover and the rib of the main body.

Structure (9): A lens-fitted film unit according to Structure (8), wherein the film magazine chamber lid is fixed to at least one of the front cover and the rear cover, and is not fixed to the main body.

Structure (10): A lens-fitted film unit according to Structure (9), wherein the film magazine chamber lid is fixed to both of the front cover and the rear cover.

Structure (11): A lens-fitted film unit according to Structure (8), wherein a portion of the lib of the rear cover enters the inside more than the rib of the main body.

Structure (12): A lens-fitted film unit according to Structure (8), wherein the rib of the main body has a straight portion, a curved portion and a bent portion.

Structure (13): A lens-fitted film unit according to Structure (8), wherein a portion of the lib of the main body enters the inside more than the rib of the front cover.

Structure (14): A lens-fitted film unit according to Structure (9), wherein the fixing of the film magazine chamber lid to the front cover or the rear cover is conducted by an engagement claw.

Structure (15): A lens-fitted film unit according to Structure (14), wherein the lens-fitted film unit has not smaller than three engagement claws.

Structure (16): A lens-fitted film unit according to Structure (9), wherein the fixing of the film magazine chamber lid and the front cover or the rear cover is conducted by fusing.

Structure (17): A lens-fitted film unit according to Structure (8), wherein a portion of the side surface of the film magazine chamber lid structures a portion of the front surface of the lens-fitted film unit.

Structure (18): A lens-fitted film unit according to Structure (8), wherein a positioning section to position the front cover is provided on the rib of the main body.

Structure (19): A lens-fitted film unit according to Structure (8), wherein the lens-fitted film unit has an outer member to cover at least one portion of the front cover or the rear cover, and the outer member does not cover the film magazine chamber lid.

Structure (20): A lens-fitted film unit according to Structure (19), wherein the outer member is a label, and the label is adhered onto at least one portion of the front cover or the rear cover, and the label is not adhered onto the film magazine chamber lid.

Further, preferable Structures (21) to (27) are as follows:

Structure (21): A lens-fitted film unit, which comprising: a unit main body having, a photographing image, plane frame for forming a photographing image plane by exposing the unexposed film by a picture taking lens, and an unexposed film chamber in which the unexposed film is previously accommodated in the production process, which is provided on one side, and an exposed film chamber in which a film magazine for accommodating the exposed film, is accommodated, which is provided on the other side, with the photographing image plane frame between them; and a front cover to cover the unit main body and the rear cover to cover the unit main body, wherein the film magazine chamber lid to take out the film magazine from the bottom surface side of the lens-fitted film unit is provided; and the film magazine chamber lid is fixed to respectively the front cover and the rear cover, and is not fixed to the unit main body.

Structure (22): A lens-fitted film unit according to Structure (21), wherein the film magazine chamber lid, the front cover and the rear cover are fixed by fusing.

Structure (23): A lens-fitted film unit, which comprises: a unit main body having, a photographing image plane frame for forming a photographing image plane by exposing the unexposed film by a picture taking lens, and an unexposed film chamber in which the unexposed film is previously accommodated in the production process, which is provided on one side, and an exposed film chamber in which a film magazine for accommodating the exposed film, is accommodated, which is provided on the other side, with the photographing image plane frame between them; and a front cover to cover the unit main body and the rear cover to cover the unit main body, wherein the film magazine chamber lid to take out the film magazine from the bottom surface side of the lens-fitted film unit is provided; and a light shielding means is formed by the side wall surface of the film magazine chamber lid, the bottom surface of the film magazine chamber lid, and at least the front cover, the rear cover and the side wall surface of the main body unit.

Structure (24): A lens-fitted film unit according to Structure (23), wherein the light shielding means is structured by a rib formed on the periphery of a film magazine take-out opening, the side wall surface of the film magazine chamber lid positioned on the outer periphery of the rib, and the bottom surface of the film magazine chamber lid, in the front cover, rear cover and unit main body.

Structure (25): A lens-fitted film unit according to any one of Structures (21) to (24), wherein the fixing position of the film magazine chamber lid to the front cover and rear cover is provided at, at least one portion on the bottom surface side, front surface side, and rear surface side of the lens-fitted film unit.

Structure (26): A lens-fitted film unit according to any one of Structures (21) to (25), wherein a portion of the front cover or a portion of the rear cover is positioned on the unit main body by the fixing of the film magazine chamber lid to the front cover and the rear cover.

Structure (27): A lens-fitted film unit according to any one of Structures (21) to (26), wherein the label forming a portion of the appearance of the lens-fitted film unit is not adhered onto the film magazine chamber lid including the fixing portion.

DETAILED DESCRIPTION OF THE PREFERRED EMBODIMENT

Figure 1:
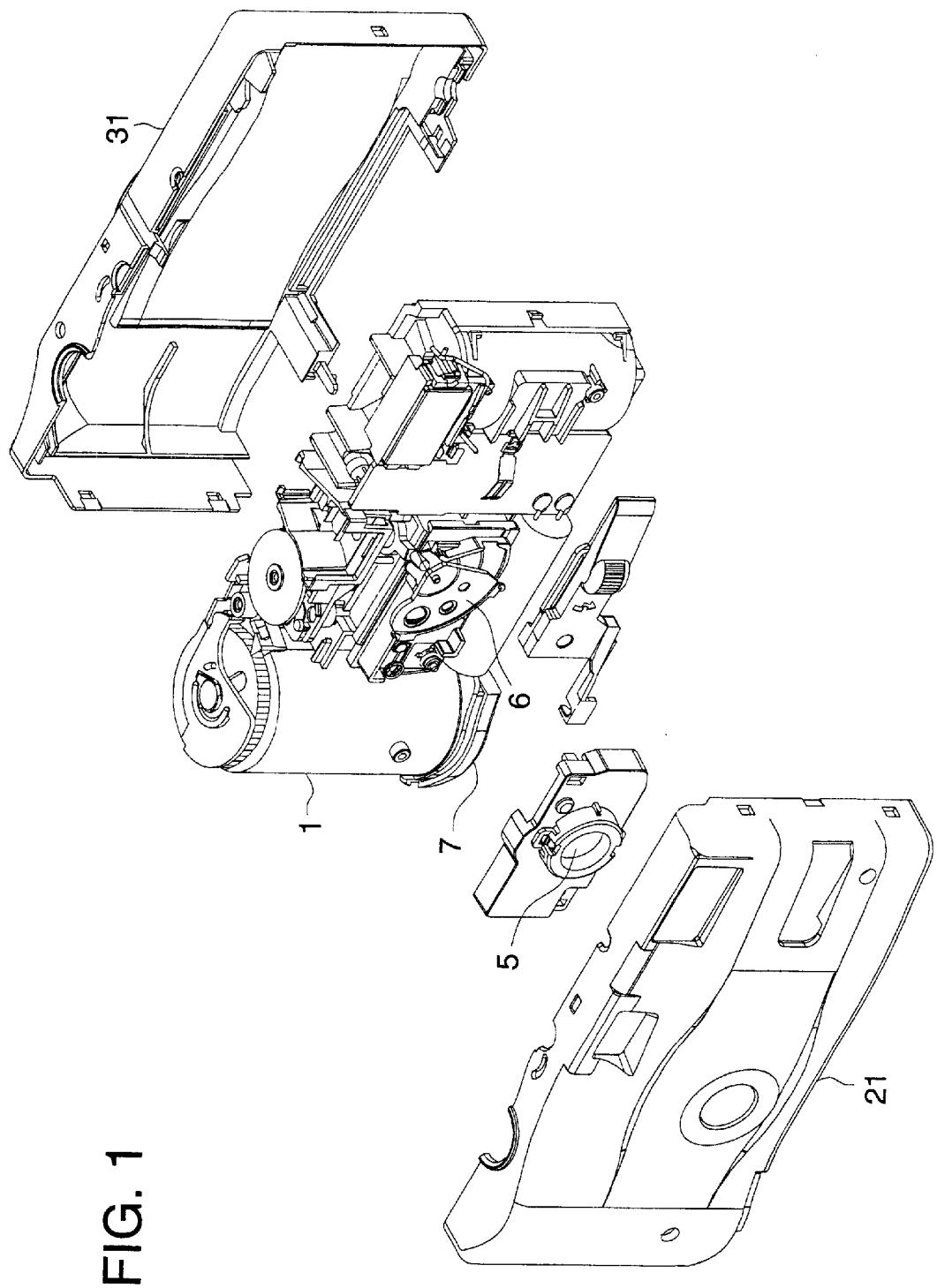
FIG. 1 is an exploded perspective view of a lens-fitted film unit.

Referring to the drawings, an embodiment of the present invention will be described below. FIG. 1 is an exploded perspective view of a lens-fitted film unit, FIG. 2 is a structural perspective view of the periphery of a film magazine chamber lid of the lens-fitted film unit, and FIG. 3 is a sectional view taken on line 3—3 in FIG. 2.

Figure 2:
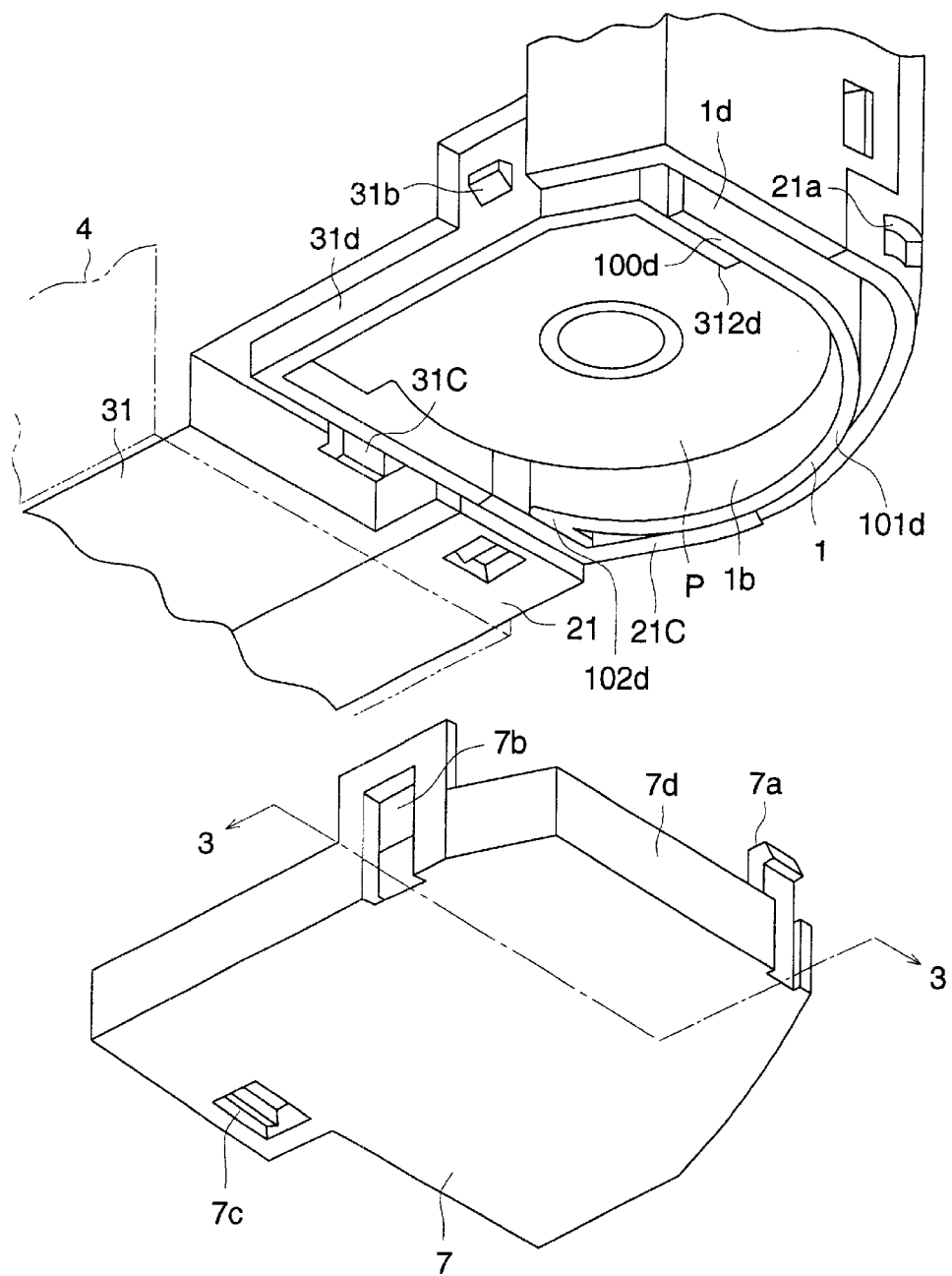
FIG. 2 is a perspective view of the structure of the periphery of a film magazine chamber lid of the lens-fitted film unit.
Figure 3:
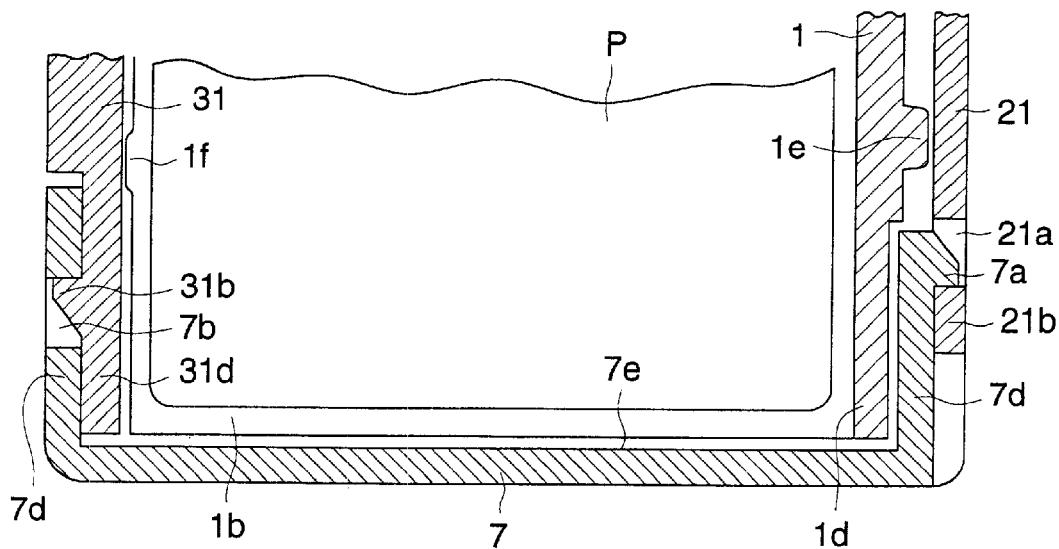
FIG. 3 is a sectional view taken on line 3—3 in FIG. 2.

As shown in FIG. 1 and FIG. 2, the lens-fitted film unit is structured by a unit main body 1, a front cover 21, a rear cover 31, a picture taking lens 5, a shutter unit 6, and the like, and the shutter unit 6 and the picture taking lens 5 are assembled in the unit main body 1, and the unit main body 1 is covered by the front cover 21 and the rear cover 31. Further, the unit main body 1 has an exposed film chamber 1b (FIG. 2), (film magazine chamber), in which the film magazine is accommodated on the bottom surface of the lens-fitted film unit (below the exposed film chamber), a film magazine take-out opening to take out the film magazine P in which the exposed film is accommodated, is formed, and is structured so that it is covered by a film magazine chamber lid 7. The film magazine chamber lid 7 is structured such that it is fixed onto the front covet 21 and the rear cover 31, and is not fixed onto the unit main body 1. Incidentally, it is preferable that the film magazine chamber lid is fixed onto both the front cover and the rear cover, however, it may be fixed onto only one of them.

Further, the unit main body has an un exposed film chamber in which the unexposed photographic film is previously accommodated.

Herein, referring to FIG. 2 and FIG. 3, the structure of the periphery of the film magazine chamber lid 7 will be described. The unit main body 1 is provided with the exposed film chamber 1b, and in which a film magazine P in which the exposed film is wound up by one by one frame, is accommodated. An engagement claw 7a formed on the film magazine chamber lid 7 to cover the film magazine take-out opening is engaged with an engagement hole 21a of the front cover 21 and fixed, and an engagement hole 7b and an engagement hole 7c formed on the film magazine chamber lid 7 are respectively engaged with an engagement claw 31b and an engagement claw 31c of the rear cover 31 and fixed, thereby, the film magazine chamber lid 7 is fixed such that it covers the film magazine take-out opening. According to this structure, even when the film magazine chamber lid is attached from just under the unit main body, the film magazine chamber lid can be securely attached. Accordingly, this structure is suitable when the film magazine chamber lid is automatically attached by the machine. Further, in this structure, the engagement claw is hardly broken, and this structure is excellent for the recycling. Incidentally, the film magazine chamber lid 7 is structured such that it is not fixed to the unit main body 1. As described above, because the engagement means composed of the engagement claw and the engagement hole are provided at the positions forming almost the triangle, and the film magazine chamber lid, and the front cover and the rear cover are fixed, the film magazine chamber lid is more securely fixed.

Further, ribs are formed at the periphery of the film magazine take-out opening by the rib 1d of the unit main body 1, the rib 21c of the front cover 21, and the rib 31d of the rear cover 31, and the exposed film chamber is light-shielded by the overlap of the side wall surface 7d of the film magazine chamber lid 7 with the side wall surface of the rib 21c of the front cover 21, and further, with side wall surface of the rib 1d of the unit main body 1, and the overlap of the side wall surface 7d of the film magazine chamber lid 7 with the side wall surface of the rib 31d of the rear cover 31, and the bottom surface 7e of the film magazine chamber lid 7.

Further, as shown in FIG. 2, a portion 312d of the rib 31d of the rear cover 31 enters the inside more than the rib 1d of the unit main body 1. When the rear cover is attached so as to have such the structure, the light shielding can be more securely attained.

Further, a portion of the rib 1d of the unit main body 1 enters the inside more than the rib 21c of the front cover 21. By such the structure, the light shielding can be more securely attained.

Further, the rib 1d of the unit main body 1 has the straight portion 100d, the curved portion 101d and the bent portion 102d. By this structure, the strength of the rib of the main body can be increased, and the main body can be securely recycled. Further, the bent portion may also serve for the positioning of the front cover.

Incidentally, a portion of the side surface of the film magazine chamber lid structures a portion of the front surface of the lens-fitted film unit. By this structure, the light shielding can be more securely attained.

Further, by fixing of the film magazine chamber lid 7, the inside surface of the front cover 21 is positioned at the positioning portion 1e formed on the rib 1d of the unit main body 1, and the inside surface of the rear cover 31 is positioned at the positioning portion if formed on the unit main body 1.

The lens-fitted film unit has an outer member to cover at least one portion of the front cover or the rear cover, and the outer member preferably does not cover the film magazine chamber lid. As the outer member, a paper cover, a resin label, or the like, may be used.

Incidentally, the label 4 which is a part of the appearance, is adhered onto the lens-fitted film unit except the film magazine chamber lid 7. Accordingly, because the label 4 is not adhered onto the film magazine chamber lid 7, the film magazine chamber lid 7 can be opened without peeling off the label 4.

Herein, the take-out method of the film magazine P will be described. By an exclusive-use tool for disassembling the film magazine chamber lid (not shown), the leading edge of the tool is brought into contact with the fixed portion at which the engagement claw is engaged with the engagement hole, or its vicinity, and the engagement of the fixed portion is disengaged, and the film magazine chamber lid 7 is opened, and the film magazine P is taken out. At the time of this taking-out, even when the fixed portion is damaged, the unit main body 1 is structured so as not to be damaged.

As described above, the film magazine is taken out, and when the fixed portion is damaged, because the front cover 21, rear cover 31, or film magazine chamber lid 7 is replaced, and the unit main-body 1 in which the shutter unit, picture taking lens, and the like, are assembled, is not replaced, the recycling is simple and its cost is low. Further, the side wall surface 7d of the film magazine chamber lid 7 is overlapped with the side wall surface of the rib 1d of the unit main body 1, and the side wall surface 7d of the film magazine chamber lid 7 is overlapped with the side wall surface of the rib 31d of the rear cover 31, thereby, the outside light beam is prevented from entering the inside from the periphery of the film magazine chamber lid.

A production method of the lens-fitted film unit of the present invention will be described below. The production method of the lens-fitted film unit of the present invention has the following steps.

The production method has: a step to disassemble the rear cover of the used lens-fitted film unit from which the film magazine in which the photographic film is accommodated, has been taken out; a step to load the unexposed photographic film into the main body; and a step to assemble the rear cover to the main body. These steps are preferably carried out in the dark place.

Then, after the rear cover is assembled, the film magazine chamber lid is attached so that the side wall portion of the film magazine chamber lid is positioned at the outside of the rib of the front cover, the rib of the rear cover, and the rib of the main body. In this case, it is preferable that the film magazine chamber lid is attached so that the film magazine chamber lid is fixed onto at least one of the front cover and the rear cover, and is not fixed onto the main body.

Further, it is preferable that the rear cover is attached so that a portion of the rib of the rear cover enters the inside more than the rib of the main body.

Further, it is preferable that the production method has a step to provide the outer member such as a label, or a paper cover, on the lens-fitted film unit so that the packing member covers at least one portion of the front cover or the rear cover, and does not cover the film magazine chamber lid. By this method, when the film magazine is taken from the exposed lens-fitted film unit, because it is not necessary to remove the outer member, the operation can be efficiently carried out, which is preferable.

(Embodiment 2)

Figure 4:
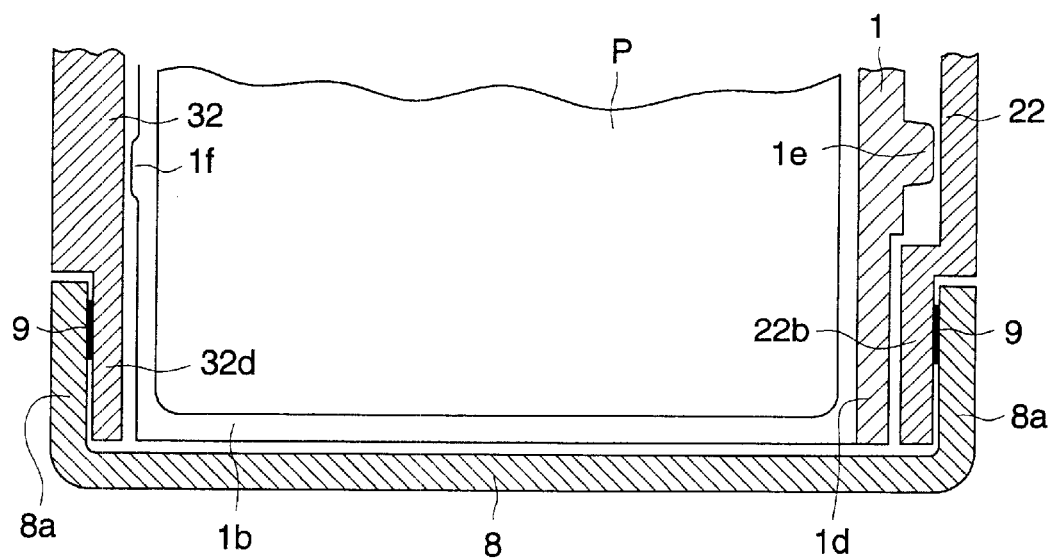
FIG. 4 is a sectional structural view of the periphery of another film magazine chamber lid of the lens-fitted film unit.

Referring to the drawings, another embodiment will be described below. FIG. 4 is a sectional structural view of the periphery of another film magazine chamber lid of the lens-fitted film unit. As shown in FIG. 4, the unit main body 1 is covered by the front cover 22 and the rear cover 32. The exposed film chamber 1b is provided in the unit main body 1, and in the exposed film chamber 1b, the film magazine P in which the exposed film is accommodated, is accommodated, and it is light-shielded.

The film magazine chamber lid 8 is a lid for taking out the film magazine P from the bottom surface side of the lens-fitted film unit, and the side wall surface 8a formed on the film magazine chamber lid 8 is fused with the side wall surface of the rib 22b of the front cover 22 at a fusing portion 9, and further, the other side wall surface 8a formed on the film magazine chamber lid 8 is fused with the side wall surface of the rib 32d of the rear cover 32 at a fusing portion 9, and fixed. Further, the side wall surface 8a of the film magazine chamber lid 8 is overlapped with the side wall surface of the rib 22b of the front cover 22, and the sidewall surface 8a of the film magazine chamber lid 8 is overlapped with the side wall surface of the rib 32d of the rear cover 32, thereby, the outside light beam is prevented from entering the inside from the periphery of the film magazine chamber lid 8.

In order to open the film magazine chamber lid 8, the fusing portion 9 is broken and peeled off, and the film magazine chamber lid 8 is opened, however, when the film magazine chamber lid 8 is peeled off once, the recycling is made impossible. Incidentally, because the unit main body 1 is structured such that the fusing portion is not provided on the unit main body 1, the unit main body 1 is not damaged by opening the film magazine chamber lid 8.

As described above, when the fusing portion 9 of the film magazine chamber lid 8 is broken and peeled off, the film magazine chamber lid 8 is made such that it can not be recycled, and the re-loading of the new film is made impossible except the production factory. Further, because the unit main body 1 including the shutter unit and the picture taking lens is not replaced, the recycling is simple and its cost is low. Further, the side wall surface 8a of the film magazine chamber lid 8 is overlapped with the side wall surface of the rib 22b of the front cover 22, and the side wall surface 8a of the film magazine chamber lid 8 is overlapped with the side wall surface of the rib 32d of the rear cover 32, thereby, the outside light beam is prevented from entering the inside from the periphery of the film magazine chamber lid 8.

According to the above-described structure, the following effects can be obtained. That is, according to the invention of the first aspect, the film magazine chamber lid is not fixed onto the unit main body, and fixed onto the front cover and the rear cover, and in the recycling, even when the film magazine chamber lid, or fixed portion of the front cover or the rear cover is damaged, the unit main body in which each kind of mechanism is assembled, can be made not to be influenced, thereby, the recycling becomes easy.

According to the present invention, because the film magazine chamber lid, and the front cover and the rear cover are fixed by fusing, in addition to the effect of the above first aspect, after the fusing is peeled off and these are released, when the film magazine chamber lid is made so that it can not be recycled, the re-loading of the new film by traders except the manufacturer can be prevented.

According to the present invention, because the side wall surfaces are overlapped at the film magazine chamber lid and at least the front cover, rear cover, and the main body unit, the unnecessary light beam from the periphery of the film magazine chamber lid into the inside of the unit main body can surely be shielded.

According to the present invention, because the film magazine chamber lid, and the front cover and the rear cover are fixed at least 3 positions, the film magazine chamber lid can more surely be fixed.

According to the present invention, because the fixing position of the film magazine chamber lid to the front cover and the rear cover exists at, at least, one position on the bottom surface side, front surface side and the rear surface side of the lens-fitted film unit, the fixing of the film magazine chamber lid is secured, and the structure is simple.

According to the present invention, because the label is not adhered onto the film magazine chamber lid, the film magazine chamber lid can be opened without peeling off the label.

Disclosed embodiment can be varied by a skilled person without departing from the spirit and scope of the invention.

What is claimed is:

1. A method of producing a lens-fitted film unit comprising (a) removing a rear cover of the lens-fitted film unit which has been used and in which a magazine storing a photographic film has been removed;

(b) loading an unexposed photographic film, to a main body of the lens-fitted film unit; and (c) attaching the rear cover to the lens-fitted film unit;

wherein the lens-fitted film unit has the main body, a front cover and the rear cover for covering the main body, wherein the main body has a magazine chamber for accommodating the magazine to store the photographic film, and an unexposed film chamber in which the unexposed photographic film has been stored in advance; wherein the lens-fitted film unit has a magazine chamber lid provided on a bottom surface of the lens-fitted film unit and below the magazine chamber from which the magazine is removed through the magazine chamber lid, wherein the front cover, the rear cover and the main body have respective ribs, and a periphery of a lower portion of the magazine chamber is surrounded by the respective ribs of the front cover, the rear cover and the main body; and (d) mounting the magazine chamber lid to the lens-fitted film unit after attaching the rear cover so that a side wall portion of the magazine chamber lid is located outside the respective ribs of the front cover, the rear cover and the main body, and mounting the magazine chamber lid so that the magazine chamber lid is fixed to at least one of the front cover and the rear cover, and is not fixed to the main body.

2. The method of claim 1, wherein the magazine chamber lid is fixed to the front cover or the rear cover by an engagement claw.

3. The method of claim 1, wherein the rear cover is attached so that a part of the rib of the rear cover is positioned inside the rib of the main body.

4. The method of claim 1, wherein the rib of the main body has a straight portion, a curved portion and a bent portion.

5. The method of claim 1 further comprising the step of providing an outer member to the lens-fitted film unit so that at least a part of the front cover or the rear cover is covered by the outer member and the magazine chamber lid is not covered by the outer member.

6. The method of claim 5, wherein the outer member is made of a label which is adhered to at least a part of the front cover or the rear cover, and is not adhered to the magazine chamber lid.

7. A lens-fitted film unit comprising:

(a) a main body;

(b) a photographic film which has been stored in advance in the main body;

(c) a front cover for covering the main body; and (d) a rear cover for covering the main body, wherein the main body has a magazine chamber for accommodating a magazine to store the photographic film; and (e) a magazine chamber lid provided below the magazine chamber for covering an opening arranged on a bottom surface of the lens-fitted film unit;

wherein the front cover, the rear cover and the main body have respective ribs, and a periphery of a lower portion of the magazine chamber is surrounded by the respective ribs of the front cover, the rear cover and the main body, wherein the magazine chamber lid is fixed to at least one of the front cover and the rear cover and is not fixed to the main body, and wherein a side wall portion of the magazine chamber lid is located outside the respective ribs of the front cover, the rear cover and the main body.

8. The lens-fitted film unit of claim 7, wherein the magazine chamber lid is fixed to the front cover and the rear cover.

9. The lens-fitted film unit of claim 7, wherein the magazine chamber lid is fixed to the front cover or the rear cover by an engagement claw.

10. The lens-fitted film unit of claim 9, wherein the lens-fitted film unit has three or more engagement claws.

11. The lens-fitted film unit of claim 7, wherein the magazine chamber lid is fixed to the front cover or the rear cover by welding.

12. The lens-fitted film unit of claim 7, wherein a part of the rib of the rear cover is mounted inside the rib of the main body.

13. The lens-fitted film unit of claim 7, wherein the rib of the main body has a straight portion, a curved portion and a bent portion.

14. The lens-fitted film unit of claim 7, wherein a part of the rib of the main body is mounted inside the rib of the front cover.

15. The lens-fitted film unit of claim 7, wherein a part of a side surface of the magazine chamber lid constitutes a part of a front surface of the lens-fitted film unit.

16. The lens-fitted film unit of claim 7, wherein the rib of the main body has a positioning portion for positioning the front cover.

17. The lens-fitted film unit of claim 7 further comprising an outer member for covering at least a part of the front cover or the rear cover, wherein the outer member does not cover the magazine chamber lid.

18. The lens-fitted film unit of claim 17, wherein the outer member is made of a label which is adhered to at least a part of the front cover or the rear cover, and is not adhered to the magazine chamber lid.

* * * * *